Jan. 3, 1950 — E. G. SCHEIBEL — 2,493,265
EXTRACTION APPARATUS
Filed Nov. 26, 1947 — 2 Sheets-Sheet 1
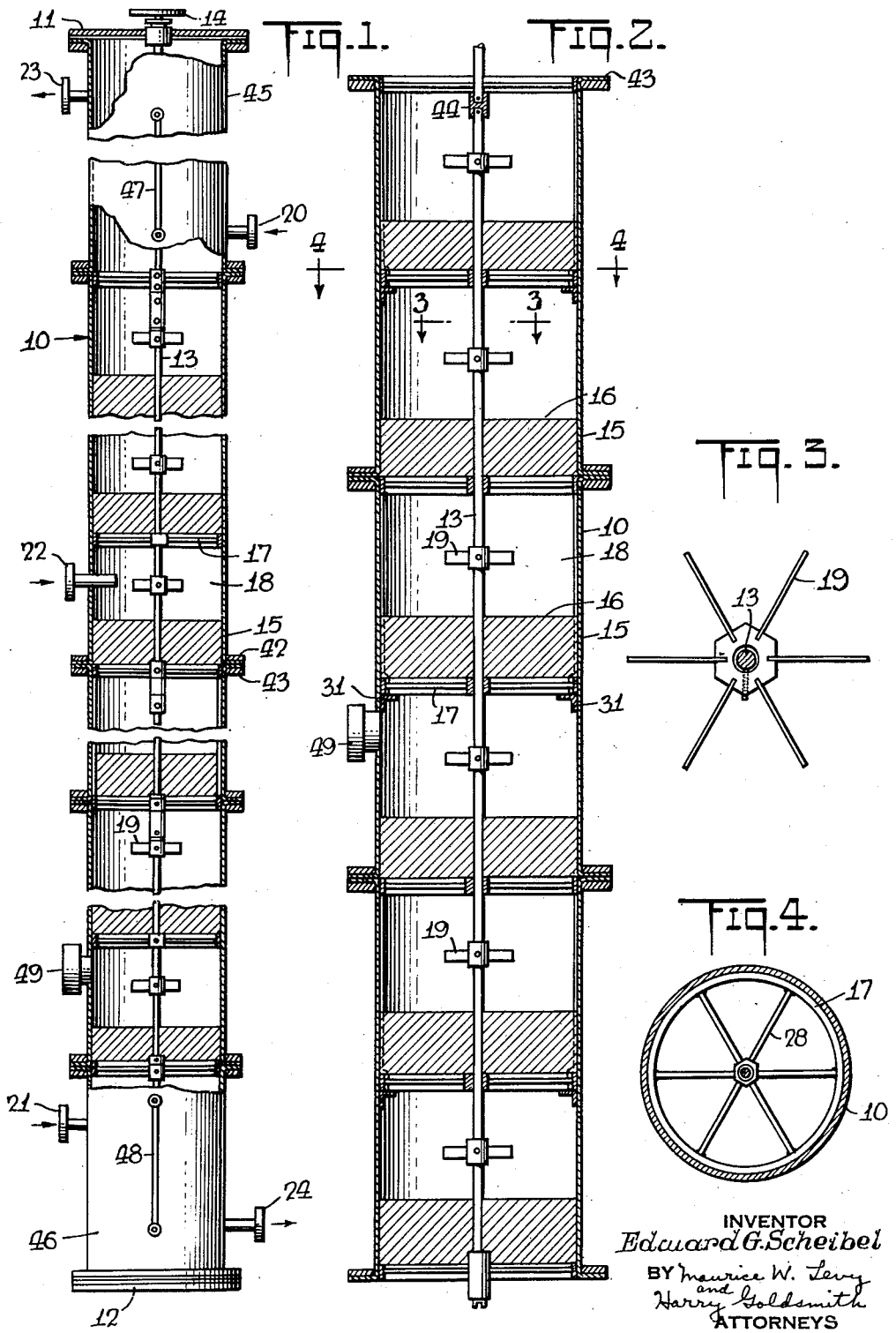
INVENTOR
Edward G. Scheibel
BY Maurice W. Levy
and Harry Goldsmith
ATTORNEYS Jan. 3, 1950 E. G. SCHEIBEL 2,493,265
EXTRACTION APPARATUS
Filed Nov. 26, 1947 2 Sheets-Sheet 2
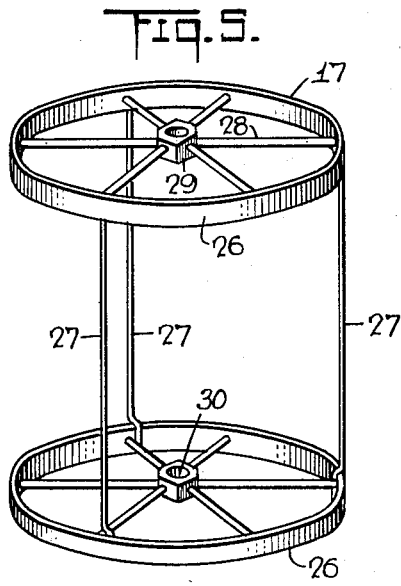
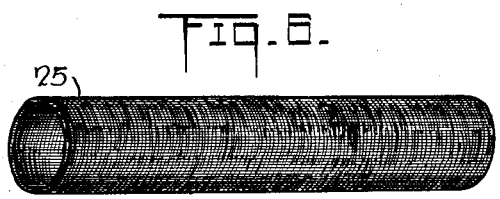
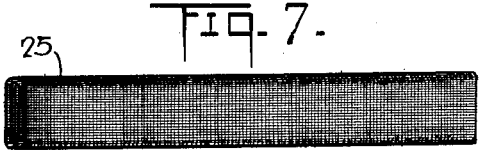
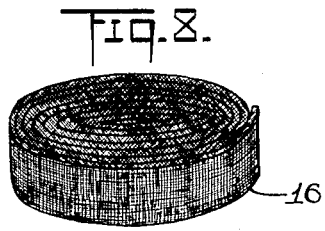
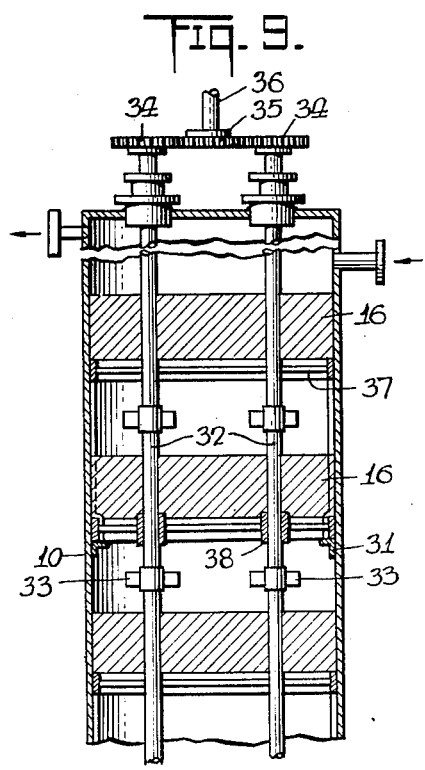
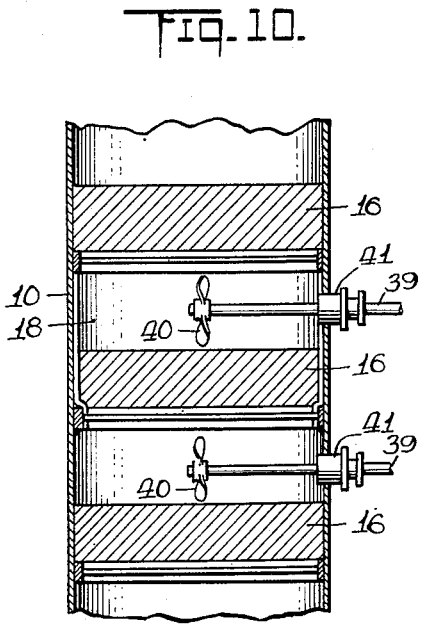
INVENTOR
*Edward G. Scheibel*
BY *Maurice W. Levy*
and
*Harry Goldsmith*
ATTORNEYS Patented Jan. 3, 1950

2,493,265

UNITED STATES PATENT OFFICE 2,493,265

EXTRACTION APPARATUS

Edward G. Scheibel, Nutley, N. J., assignor to Hoffmann-La Roche Inc., Nutley, N. J., a corporation of New Jersey Application November 26, 1947, Serial No. 788,293

2 Claims. (Cl. 23—270.5)

The present invention relates to a countercurrent liquid extractor.

It is among the objects of my invention to provide a countercurrent liquid extractor which is compact, easy to construct, is highly efficient for large scale extraction, and permits a large number of equilibrium stages in a single relatively small unit.

Known methods of countercurrent liquid extraction of liquid mixtures are generally of two types. The first type is designated as the batch countercurrent multiple contact method and employs a plurality of one-stage steps. It requires an apparatus consisting of a plurality of separate, external and alternate mixing and settling units connected by pipes and pumps to circulate the liquids. The solvent or solvents and the mixture to be extracted are contacted in the mixer, separated in the settler, and the separated components pass in opposite directions or countercurrent to other mixing and separating steps. A pair of mixing and settling steps is known as a "stage."

In the batch countercurrent process, large quantities of equipment are required. Many pumps, tanks, agitators and mixers are needed. The amount of space required to contain such equipment is considerable and for processes requiring 20–50 stages, the amount and size of the equipment would be so great as to be impractical. As a result, commercial large scale extraction equipment is limited, for practical reasons, to less than ten and mostly less than five stages.

The second type of extraction method is carried out by permitting the liquids to flow continuously and countercurrently in a chamber filled with various types of objects called packing which serve to obstruct the direct flow of the liquids and to provide better contact between the lighter rising liquid and the heavier settling liquid in the chamber.

The apparatus heretofore proposed for carrying out extraction operations of the types above described are limited in use to only either the batch process or the packed column method. In none of the heretofore proposed devices can both operations of mixing and countercurrent flow through a packed bed be carried out simultaneously and in sequence. Thus, in the batch apparatus, the liquids are mixed in a mixer, discharged into a settler where the liquids separate, no further extraction occurring in the settler. The separated liquors are then pumped countercurrently to the other mixers without flowing in contact with each other. On the other hand, in the packed column, there is no mixing, except that which may be incidentally produced at the initial introduction of one of the liquids into the column, which might be effected by a spray nozzle or other distributing device.

Packed columns usually give poor results because even the small diameter columns require several feet of packing to be equivalent to one stage and the larger diameter columns are much less efficient. A given height of packing in a large column, say six feet in diameter, will give only a fraction of the extraction efficiency obtained in a small diameter column, say 4" or 6" in diameter having the same height of packing. Moreover, the serious problem of channeling is also encountered in such columns, which results in very little contacting between the ascending light liquid and descending heavy liquid.

Numerous and various types of apparatus have heretofore been proposed to improve the efficiency of the packed column countercurrent liquid extractor, and to carry out the individual stage extraction in a single unit, but as far as known, none has met with any notable commercial success.

In U. S. Patent 2,072,382, a slowly rotating diaphragm extending across the whole diameter of the packed column is employed as a redistributor of the liquids to prevent channeling. This has the disadvantage of blocking intimate countercurrent flow of liquids through each other with resultant loss in extraction efficiency.

In U. S. Patent No. 2,000,606, a complicated cone structure involving a trap for the heavy liquid is employed. The cone structure prevents intimate countercurrent flow contact between the liquids, since the lighter liquid primarily flows upwardly through the inside of the cone, separate from the heavier liquid which flows downwardly primarily along the outside wall of the cone. Furthermore, the height of the cone required increases with the diameter and a larger unit would require a proportionably greater height for each stage. Thus, large scale columns with a large number of stages become exceedingly bulky and expensive. The unit, because of its complicated features, is also difficult and expensive to fabricate.

In U. S. Patent No. 2,154,713, there is disclosed diagrammatically an extractor in substantially horizontal position composed of a series of alternate so-called mixing and settling spaces separated by wire gauze dividers. The extractor as described in the example, as can be seen, is a laboratory device, being only two meters long and 4 cm. in diameter, the mixing spaces, 1.5 cm. long and the settling spaces only 0.5 cm. The lighter solvent can flow only lengthwise along the top of the tube, while the heavier solvent can flow only lengthwise along the bottom of the slightly inclined tube. There can accordingly be no intimate countercurrent flow of the liquids through one another in the settling spaces.

The device appears to be analogous to the extractor described by Cornish, Archibald, Murphy and Evans illustrated in Figures 4-7 inclusive, pages 401-404, Journal of Industrial and Engineering Chemistry, vol. 26 (1934) reference to which is made in the patent. Cornish et al. employ a series of blocks mounted in a slightly inclined tube. The blocks are bored with small holes which confine flow of the liquids through a small passageway. This limits the overall capacity of the extractor to a small fraction of what it would be if the entire diameter were available for separation of the phases. Furthermore, the device would not operate in vertical position.

As stated by Fenske et al., J. Industrial and Engineering Chemistry, October 1947, page 1322, "Despite . . . advantages of liquid-liquid separational processes, the problems of accumulating twenty or more theoretical liquid-liquid extraction stages in a single compact and relatively simple countercurrent operation have not yet been wholly solved."

An object of my invention is to overcome the disadvantages of the prior art, and to provide a countercurrent extractor of simple construction, yet of high efficiency and large capacity which includes any desired number of stages and permits carrying out both operations of mixing and countercurrent settling in a single compact and relatively simple unit without any intermediate external handling of solvents.

In general my invention comprises a substantionally vertical column or chamber provided with a mixing section in which one or more agitators are installed to promote intimate contact between the liquids so as to cause equilibrium contact between them. Above and below the mixing chamber are layers of fibrous packing, preferably of the self-supporting type, as for example, a roll of tubular knitted wire mesh. The packing stops the circular motion of the liquids and permits them to separate. Thus, in the lower layer of packing the heavier liquid settles out and flows downward, countercurrently to and through a rising stream of lighter liquid. Similarly in the upper layer of packing the rising stream of lighter liquid flows countercurrently to and through a descending stream of heavier liquid. Additional mixing and packed sections can be installed alternately above and below these packed sections, so as to provide a number of stages.

The agitators can be mounted on a central shaft extending through the column. The shaft is rotated by any suitable device, such as a motor. Paddle type agitators are preferred. The blades on the agitators are pitchless, being vertically mounted to produce intimate mixing without imparting either an upward or downward thrust on the liquid mixture, thereby permitting the liquids to separate by gravity due to their different densities.

The size of the agitators is such that it does not block in any substantial way the countercurrent flow of the liquids during agitation.

Instead of employing agitators mounted on one centrally located shaft, side entering shafts with propeller-bladed agitators can be employed in the mixing chambers. Where, however, large capacity and hence large cross-section of the extractor is desired with a minimum height of mixing section, it is simpler to mount the agitators on two or more vertical shafts passing through the packing and uniformly spaced over the cross-section of the column. In small diameter extracting apparatus, one centrally located shaft with a single agitator for each mixing section is sufficient; but on large diameter units, a plurality of rotatable shafts, each with an agitator for each mixing section will insure uniform mixing over the entire cross-section in a relatively small height of mixing section.

The novel extracting apparatus has been found to be more efficient than the heretofore known devices since it substantially gives one theoretical equilibrium stage in the mixing chamber and a fractional part of an equilibrium stage in the packed section depending on its height. Thus, it has been possible to obtain better than one theoretical or equilibrium stage for each combination of a mixing section and packed section. It is essential that the device be installed substantialy vertically for best efficiency in the operation of the packed section. Liquid entry and discharge means, such as ports are provided near the top and bottom of the column, and there is also an intermediate port along the length of the column for introduction of the liquid mixture to be separated.

The device is particularly useful for the countercurrent extraction of miscible liquids by the employment of one or more immiscible or partially immiscible liquids differing substantially in specific gravity and having a selective solvent action for one of the components of the original mixture. Thus it may be employed to extract a component from one solution with another solvent which is at least partially immiscible in this solution; or it may be used to separate two components, one of which is preferentially soluble in one solvent and the other being preferentially soluble in the other solvent. The invention provides a liquid extraction apparatus in which two liquids are contacted alternately in a mixing section and then by countercurrent flow over a packed section, all of the operations being carried out in a single unit.

Reference will now be made to the appended drawing in which like reference characters refer to like parts throughout and in which:

Figure 1 is a partial cross-sectional elevation of one form of my apparatus.

Figure 2 is a cross-sectional elevation of a subassembly unit out of which the extracting column can be assembled.

Figure 3 is a plan view along line 3—3 of Figure 2, of one of the agitators employed in the device.

Figure 4 is a plan view along line 4—4 of Figure 2 of a steady bearing and support for the packing element.

Figure 5 is a detailed elevation of the steady bearing and packing support.

Figure 6 is a detailed view of a tubular knitted metal fabric from which the packing element can be formed.

Figure 7 is a view of the packing in another stage of its formation.

Figure 8 is a detailed view of the finished packing rolled up for insertion in the column to form a packed section.

Figure 9 is a part cross-sectional elevation of another form of my apparatus in accordance with my invention showing a plurality of agitators mounted on a plurality of rotatable shafts, which are parallel to the axis of the column.

Figure 10 is a part cross-sectional view of another modification of my apparatus showing side-entering agitators in the mixing chambers.

Referring now to the drawings, Figure 1 shows in partial cross-section a column, tower or chamber 10, having a top 11, and bottom 12. Extending through the center of the chamber is a vertical rotatable shaft 13. The shaft is rotated by a gear or pulley 14 by any suitable driving means, as a motor (not shown).

The chamber is divided into any desired number of packed sections 15 by packings 16 which can be held in place by a support, such as a spider 17. Between the packed sections 15, mixing sections 18 are provided. Agitators 19 with flat vertical blades are fixed rigidly, as by a set screw on the shaft 13 in the mixing sections. The blades exert neither an upward nor downward thrust on the liquids in the mixing section, and are of such size that they do not interfere with the countercurrent flow of the liquid in the mixing chambers. Liquid inlets 20, 21 and 22 are provided at or near the top, bottom and at an intermediate point in the chamber, and liquid outlets 23 and 24 at or near the top and bottom.

The packings 16 in the packed sections 15 can be of a fibrous material such as steel wool in which case a support 17 is employed to separate the packed portions. It is preferred, however, to employ a self-supporting packing which remains fixed in position by means of lugs attached to the inner wall of the column, thereby eliminating the use of a supporting device as the spider 17. A preferred packing is one prepared from a tubular knit wire mesh fabric 25 (see Figure 6), which is flattened and may be folded (see Figure 7) and then rolled up spiralwise to form the packing 16 (see Figure 8). With such a packing, "channeling" is eliminated. The packing can also be prepared by rolling up a single thickness or webbing of metal cloth, or by cutting a number of pieces of proper shape out of a metal cloth and piling them horizontally on top of one another until a packing of the desired height is built up. Still other methods of formation will be familiar to those skilled in the art, without departing from the spirit of my invention.

The spider support 17 (see Figure 5) comprises two ring portions 26 welded to tie pieces 27. Elements such as rods 28 are welded to the rings 26 and to annular members 29, the latter providing a passageway for shaft 13. Some of the annular members are provided with suitable bearings 30 to steady the shaft. The support is affixed to the column as by welding one of the spiders to the inside wall of the column at any desired position or by resting on angle shaped lugs 31 affixed to the inside of the column.

Figure 9 discloses in vertical cross-section a modified form of extractor in which there are a plurality of vertical rotatable shafts 32 and agitators 33 distributed over the cross-section of the chamber to maintain complete mixing of the liquids. The shafts are provided with gears 34, driven by gearing 35, through a single drive shaft 36 driven by a driving means, such as a motor (not shown). Any other multiple drive assembly may be employed for this purpose. The packing can be held in place by any suitable support 37 such as already described, some of these supports being provided with steady bearings 38 where desired. Any other suitable supports, it will be understood, can be employed.

Figure 10 shows rotatable shafts 39 entering the mixing sections 18 through the side of the chamber 10 and provided with propeller type agitators 40. Stuffing boxes 41 are provided for the shafts. These shafts are rotated by a suitable driving means (not shown).

In the apparatus hereinabove described, a mixing section 18 and a packed section 15 form a stage. It will be understood that although the drawings show the extracting apparatus with a certain number of stages, any desired number can be installed, depending on the number of stages found most efficient for extracting any mixture of liquids with any particular immiscible solvent or solvents. By employing the necessary number of stages it is possible fractionally to extract essentially pure components in a single pass through the unit. Thirty or more stages can be readily built in a single unit. Such a unit can be assembled from subassembly sections having several stages shown in Figure 2; the sections being joined together by welding or bolting at the flanges 42 and 43; and the sections of the shaft 13 being coupled together by couplings 44.

The top and bottom portions of the column may form decanting sections 45 and 46. These sections can be provided with sight gauges 47 and 48. The column may also be provided with sight glasses 49, at convenient places along the length of the column.

As illustrative of the operation of the extracting apparatus, a mixture of miscible liquids which it is desired to separate into its components is charged into the chamber 10, through inlet 22. The light immiscible selective solvent for one of the components is admitted through inlet 21 of the chamber. The heavy immiscible selective solvent for the other component is admitted through inlet 20. The light solvent then passes upwardly and the heavy solvent downwardly due to their differences in specific gravities. In each mixing section 18 the countercurrent flowing liquids are violently agitated by the agitators 19 so as to be brought into intimate contact approaching equilibrium. The optimum speed of rotation of the shaft and the feed of liquids into the column are predetermined for each particular case, and are regulated accordingly for optimum results. Speeds below the optimum give inadequate contact in the mixing chamber and excessive speeds cause emulsion formation which cannot be broken in packed sections and the column shows an effect of "flooding" so the liquids cannot pass through it.

In the packed sections 15 below and adjacent the mixing section 18, the packing 16 stops any circular motion of the liquids caused by agitation, the heavier liquid settles out and flows downward countercurrently to and through a rising stream of lighter liquid carrying its dissolved component. Similarly in the packed section 15 above and adjacent the mixing section 18, the packing stops any circular motion of the ascending stream of light liquid, and the liquid flows upwardly countercurrently to and through a descending stream of heavier liquid carrying its dissolved component. Thus the lighter liquid progresses upwardly through the chamber continuously extracting one component and the heavy liquid progresses downwardly continuously extracting the other component each through all the packed sections and mixing sections until the light liquid leaves the exit 23 in the upper decanting section 45 of the column, carrying essentially only one component of the mixture; and the heavy liquid leaves the exit 24 in the lower decanting section 46 of the column carrying essentially only the other component of the mixture. By continuous introduction of the liquids, the extraction operation can be carried out continuously.

The device can also be employed to separate a mixture of solids by dissolving the mixture in one of the solvents, and introducing the solution through inlet 22. It can also be operated to extract a mixture of miscible liquids with a single immiscible solvent for one of the components. In this case, inlet 22 is not employed. The point of introduction of the liquids into the apparatus depends on their specific gravities, the lighter liquid being fed into the bottom inlet and the heavier liquid into the top inlet.

In operation, the novel extracting apparatus has an efficiency higher than the theoretical for each stage. It gives one theoretical equilibrium stage in the mixing chamber and a fractional part of an equilibrium stage in the packed section depending on its height, since additional extraction takes place in the packed section due to the conutercurrent flow of the liquids through one another in this section. Thus, it has been possible to obtain better than one theoretical stage for each combination of a mixed section and a packed section. In the operation of a 3-inch inside diameter column or chamber having eleven actual stages each consisting of a mixing chamber four inches high and a packing section four inches high, I have attained an efficiency of better than 100 per cent per actual stage.

I claim:

1. A countercurrent liquid extraction apparatus comprising a substantially vertical column of substantially uniform section, containing freely communicating contiguous alternate transverse calming sections and mixing sections, said calming sections comprising intersticed entrainment separator means consisting of wire mesh packing permitting relatively free vertical fluid movement, said packing consisting of rolled tubular wire mesh knit and positioned to provide open spaces formed essentially from vertical and transverse wire elements, said mixing sections comprising agitator means mounted on a common vertical rotatable shaft, said agitator means exerting a non-vertical thrust, and said means being pitchless propeller means whose impelling faces are flat vertical surfaces, the length of said propeller means being less than the inner diameter of the column.

2. A countercurrent liquid extraction apparatus comprising a substantially vertical column of substantially uniform section, containing freely communicating contiguous alternate transverse calming sections and mixing sections, said calming sections comprising intersticed entrainment separator means consisting of wire mesh packing permitting relatively free vertical fluid movement, said packing positioned to provide open spaces formed essentially from vertical and transverse wire elements, said mixing sections comprising agitator means mounted on a common vertical rotatable shaft, said agitator means exerting a non-vertical thrust, and said means being pitchless propeller means whose impelling faces are flat vertical surfaces, the length of said propeller means being less than the inner diameter of the column.

EDWARD G. SCHEIBEL.

REFERENCES CITED

The following references are of record in the file of this patent:

UNITED STATES PATENTS

| Number | Name | Date |
|---|---|---|
| 2,072,382 | Robinson | Mar. 2, 1937 |

FOREIGN PATENTS

| Number | Country | Date |
|---|---|---|
| 521,541 | Germany | Mar. 23, 1931 |